United States Patent
Naik et al.

(10) Patent No.: US 10,911,408 B2
(45) Date of Patent: Feb. 2, 2021

(54) IDENTIFYING AND DISPLAYING APPLICATION DEPENDENCIES

(71) Applicant: VMware, Inc., Palo Alto, CA (US)

(72) Inventors: Ujwal Naik, Atlanta, GA (US); Soorya Rajasoorya, Atlanta, GA (US); Nischit Shetty, Atlanta, GA (US); Amit Yadav, Atlanta, GA (US); Sanjay Satagopan, Atlanta, GA (US); Sharath Chavva, Atlanta, GA (US); Nidhi Aggarwal, Dunwoody, GA (US); Ryan Turner, Alpharetta, GA (US); Nikhil Mehta, Atlanta, GA (US); Ali Mohsin, Alpharetta, GA (US)

(73) Assignee: VMware, Inc., Palo Alto, CA (US)

( * ) Notice: Subject to any disclaimer, the term of this patent is extended or adjusted under 35 U.S.C. 154(b) by 252 days.

(21) Appl. No.: 15/904,691

(22) Filed: Feb. 26, 2018

(65) Prior Publication Data
US 2019/0268306 A1 Aug. 29, 2019

(51) Int. Cl.
*H04L 29/06* (2006.01)
*H04L 29/08* (2006.01)
*H04L 12/46* (2006.01)
*G06F 3/0482* (2013.01)
*G06F 8/61* (2018.01)

(52) U.S. Cl.
CPC ........ *H04L 63/0272* (2013.01); *G06F 3/0482* (2013.01); *G06F 8/61* (2013.01); *H04L 12/4641* (2013.01); *H04L 63/0815* (2013.01); *H04L 63/20* (2013.01); *H04L 67/141* (2013.01); *H04L 12/4633* (2013.01); *H04L 67/306* (2013.01)

(58) Field of Classification Search
CPC . H04L 63/0272; H04L 63/20; H04L 63/0815; H04L 12/4641; H04L 67/141; H04L 67/306; H04L 12/4633; H04L 29/06; H04L 29/08; H04L 12/46; G06F 3/0482; G06F 8/61
See application file for complete search history.

(56) References Cited

U.S. PATENT DOCUMENTS

2012/0096365 A1* 4/2012 Wilkinson .............. G06F 9/468
715/740
2012/0096386 A1* 4/2012 Baumann ........... G06Q 30/0601
715/772

(Continued)

*Primary Examiner* — Kevin Bechtel
*Assistant Examiner* — Quazi Farooqui
(74) *Attorney, Agent, or Firm* — Clayton, McKay & Bailey, PC

(57) ABSTRACT

A portal application can receive a listing of available applications in response to a request sent to a management server. The listing can include a plurality of attributes for each available application, such as the requirements for using the features of each application or a dependency upon another application. Based on the plurality of attributes received, the portal application can determine that a first application requires installation of a second application in order for the first application to provide additional functionality. The portal application can display icons corresponding to the available applications and display one or more UI elements, indicating that the first application requires installation of the second application. The portal application can also push the second application to the device and assist in installing and initializing the second application on the device.

20 Claims, 7 Drawing Sheets

(56) References Cited

U.S. PATENT DOCUMENTS

2016/0162286 A1* 6/2016 Bankole .................. G06F 8/65
717/170
2017/0180387 A1* 6/2017 Hayashi ............... G06F 21/121

\* cited by examiner

IDENTIFYING AND DISPLAYING APPLICATION DEPENDENCIES

BACKGROUND

Applications can provide users with mechanisms for accessing secure information, such as corporate email or documents, on their mobile device. In some situations, one application must leverage a second application—such as a Virtual Private Network ("VPN") or "tunnel" application—in order to access secure information. For example, an application that provides access to corporate documents may depend upon a tunnel application that provides a secure connection to a document repository or management server. Without the secure connection, the corporate documents might not be accessible at all.

Generally speaking, users have little knowledge of how a tunnel application works, how a tunnel application is initialized, or which applications depend upon a tunnel application. Administrators of Mobile Device Management ("MDM") or Enterprise Mobility Management ("EMM") systems lack the tools to efficiently communicate this information with users. Instead, today's administrators must contact a user outside of the management-system environment to provide the necessary information, such as when a tunnel application is required, how to download the application, and how to initialize the application. The user is then left to download and set up the tunnel application on their own. Even then, a user may not understand which particular applications on their device require that tunnel application. The result is that many users do not effectively use the full suite of EMM tools at their disposal, lowering their productivity. Administrators likewise lose valuable time handling incompatibilities that arise when an application depends on a tunnel application that is not installed and active.

Therefore, a need exists for systems and methods that automatically determine application dependencies, inform the user of those dependencies, and assist the user in downloading and initializing the required applications.

SUMMARY

Examples described herein include systems and methods for determining dependency of first application upon a second application and informing a user of the dependency. In one example, the method can be implemented by a portal application that executes on a user device and provides a listing of applications available to the user. The portal application can display icons for the available applications and can leverage single-sign-on ("SSO") techniques to authenticate the user across multiple applications without requiring manual logins at each application.

The portal application can request a listing of applications available to the user on the user device. The request can be directed to a management server, for example, but can be routed through an intermediary server such as a coordination server. The portal application can receive a listing of available applications in response to the request. The listing can include a plurality of attributes for each available application, such as the requirements for using the features of each application. In one example, at least one of these attributes is an application-dependency attribute listed in a profile associated with the user and stored at a management server.

Based on the plurality of attributes received, the portal application can determine that a first application requires installation of a second application in order for the first application to provide additional functionality. As an example, the first application can be a secure-content-access application, such as VMWARE's CONTENT LOCKER application. That application may require installation of the VMWARE TUNNEL application in order to provide secure access to enterprise files.

The portal application can display icons corresponding to the available applications, including the first application identified previously. Based on the determination made using the plurality of attributes for the first application, the portal application can display a user interface (UI) element indicating that the first application requires installation of the second application for the first application to provide additional functionality. For example, a UI element stating "Requires VMware Tunnel App" can be displayed proximate the icon corresponding to the first application.

The portal application can also determine whether the second application is installed and set up on the user device. If the second application is not installed, the portal application can cause it to be installed. For example, it can force installation when the user attempts to access the first application. If the second application is installed but not set up, the portal application can direct the user to set up the second application when the user attempts to access the first application.

The setup process for the second application can be launched within a portal-application-specific UI within the second application that retains the same look and feel as the portal application, providing the user with a seamless experience. That UI can guide the user through a setup process. After the user completes the process, the second application can redirect the user back to the portal application, or to the first application.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for determining dependency of first application upon a second application and informing a user of the dependency. A portal application can receive a listing of available applications in response to a request sent to a management server. The listing can include a plurality of attributes for each available application, such as the requirements for using the features of each application or a dependency upon another application. Based on the plurality of attributes received, the portal application can determine that a first application requires installation of a second application in order for the first application to provide additional functionality. The portal application can display icons corresponding to the available applications and display one or more UI elements, indicating that the first application requires installation of the second application. For example, the UI can indicate that an available application requires a dependent application. The portal application can also push the second application to the device and assist in installing and initializing the second application on the device.

Figure 1:
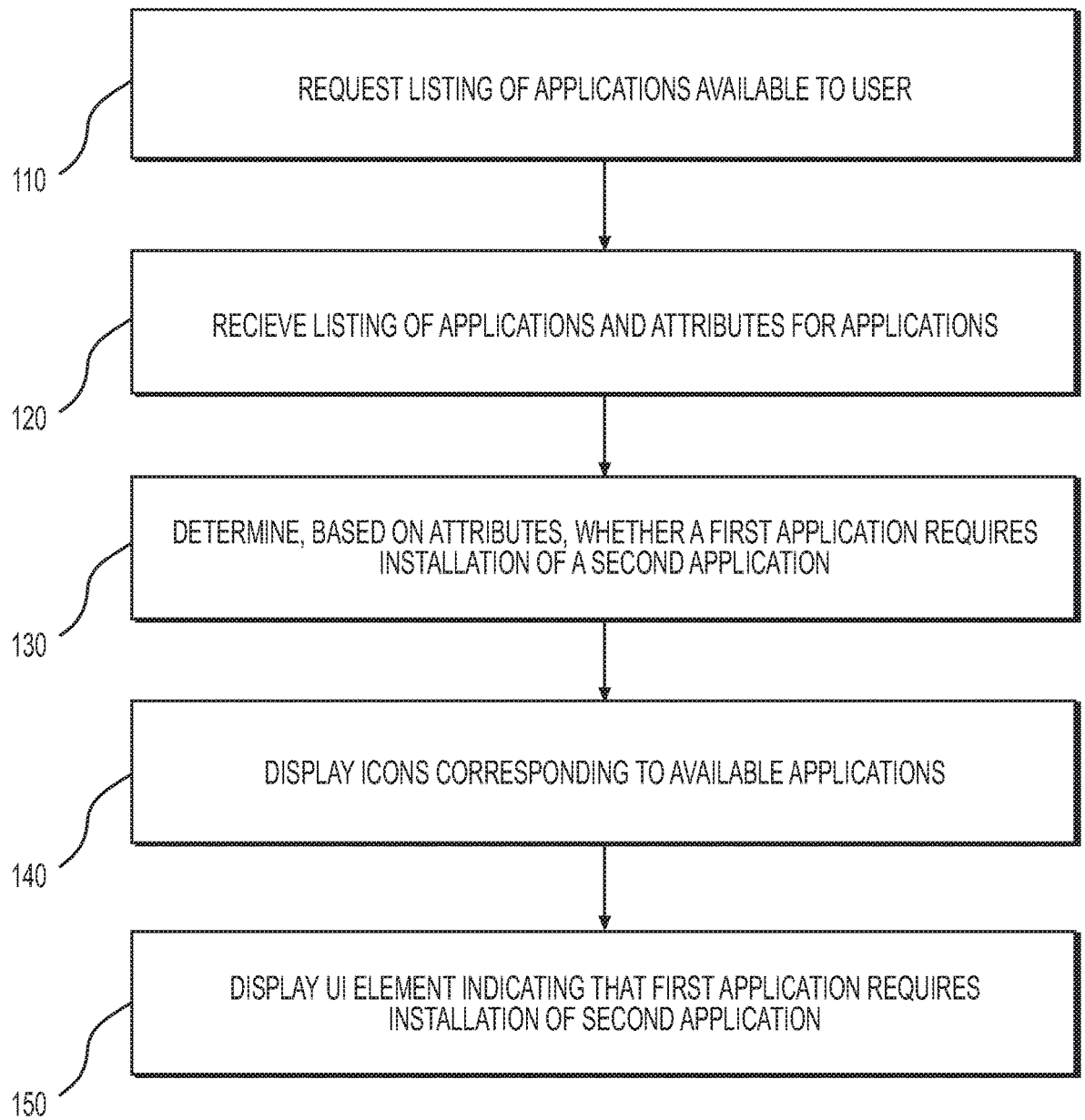
FIG. 1 is a flowchart of an exemplary method for determining dependency of first application upon a second application and informing a user of the dependency.
Figure 2:
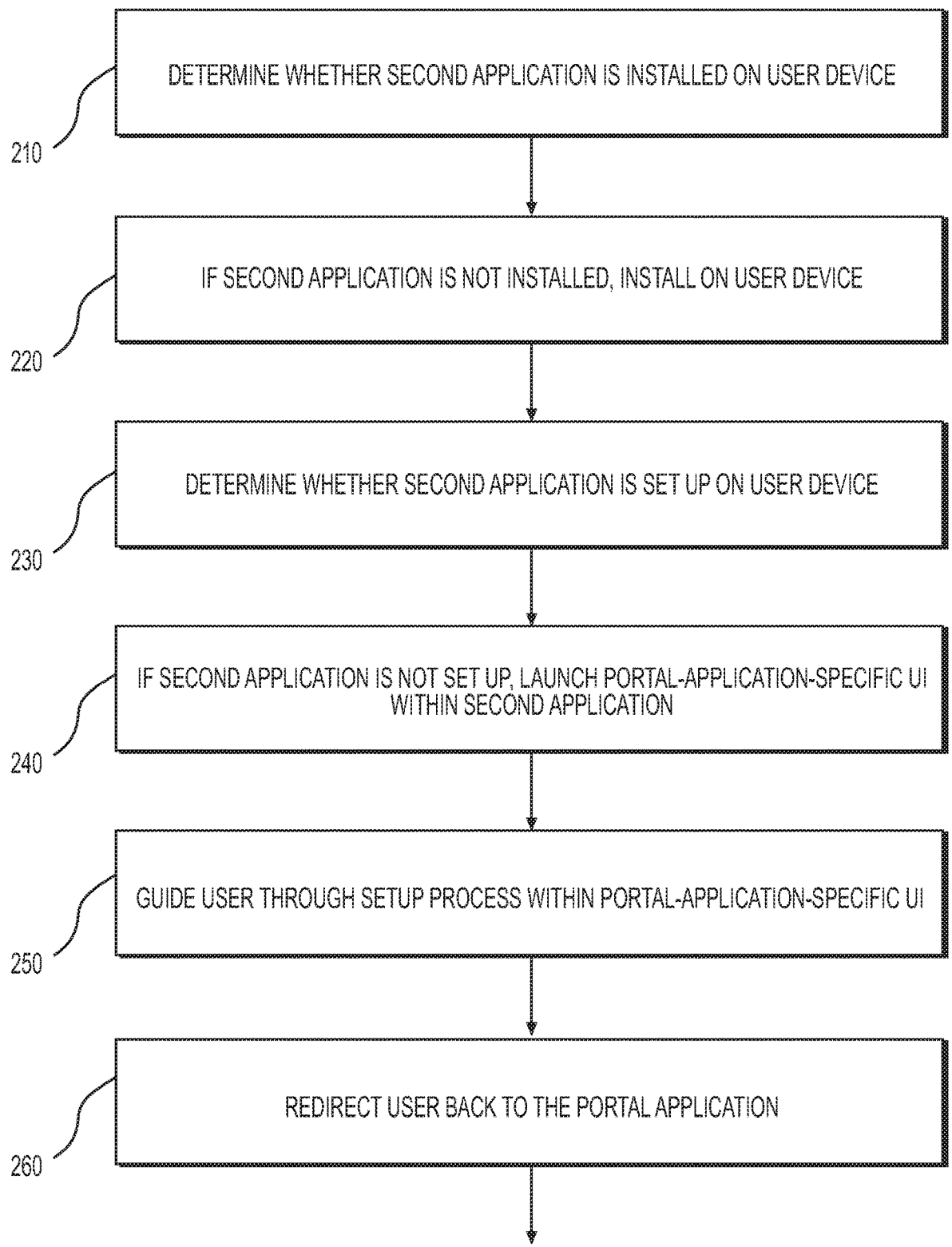
FIG. 2 is a flowchart of an exemplary method for assisting a user with installation and initialization of a dependent application.
Figure 3:
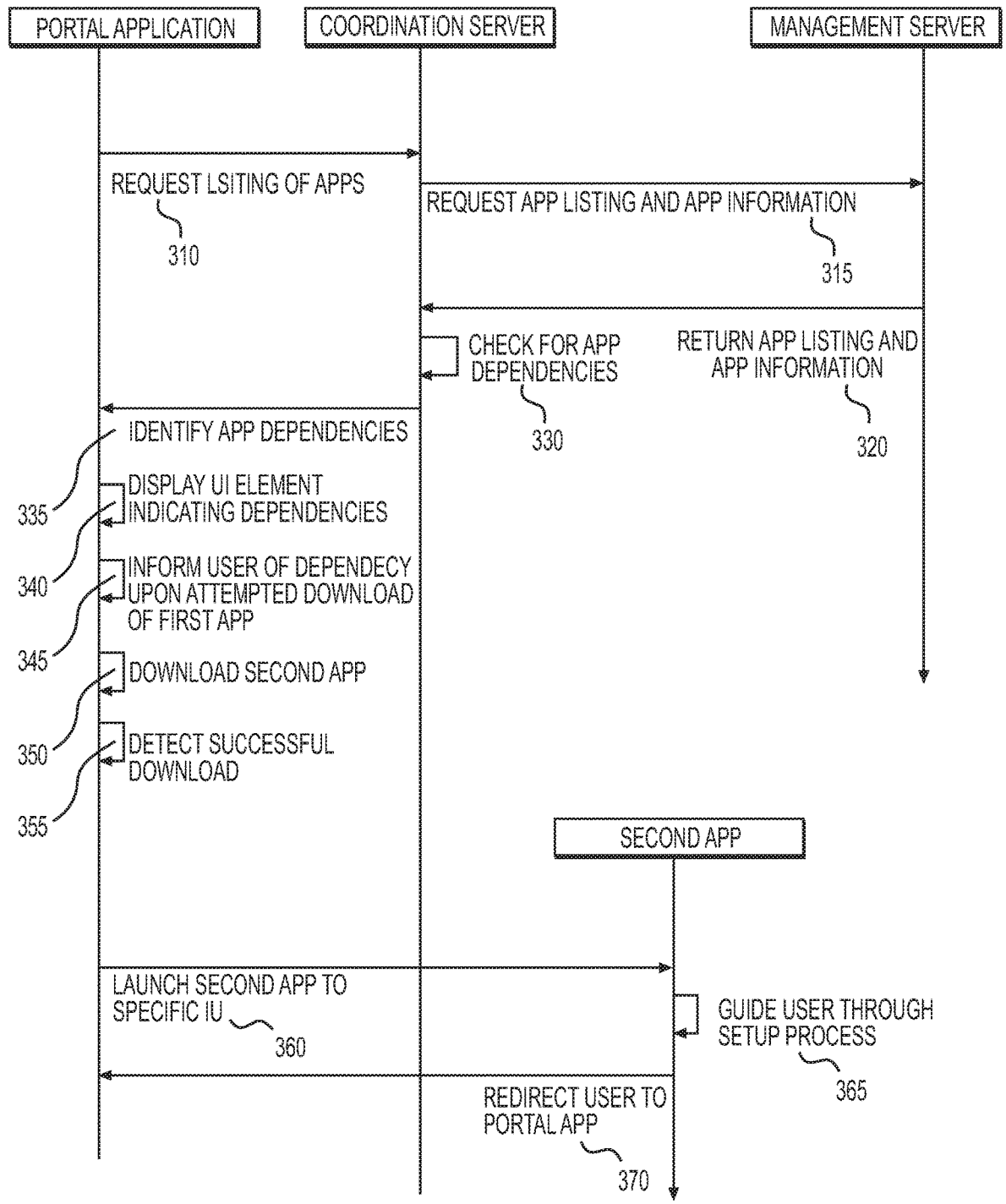
FIG. 3 is a sequence diagram of an exemplary method for determining dependency of first application upon a second application and informing a user of the dependency.
Figure 4:
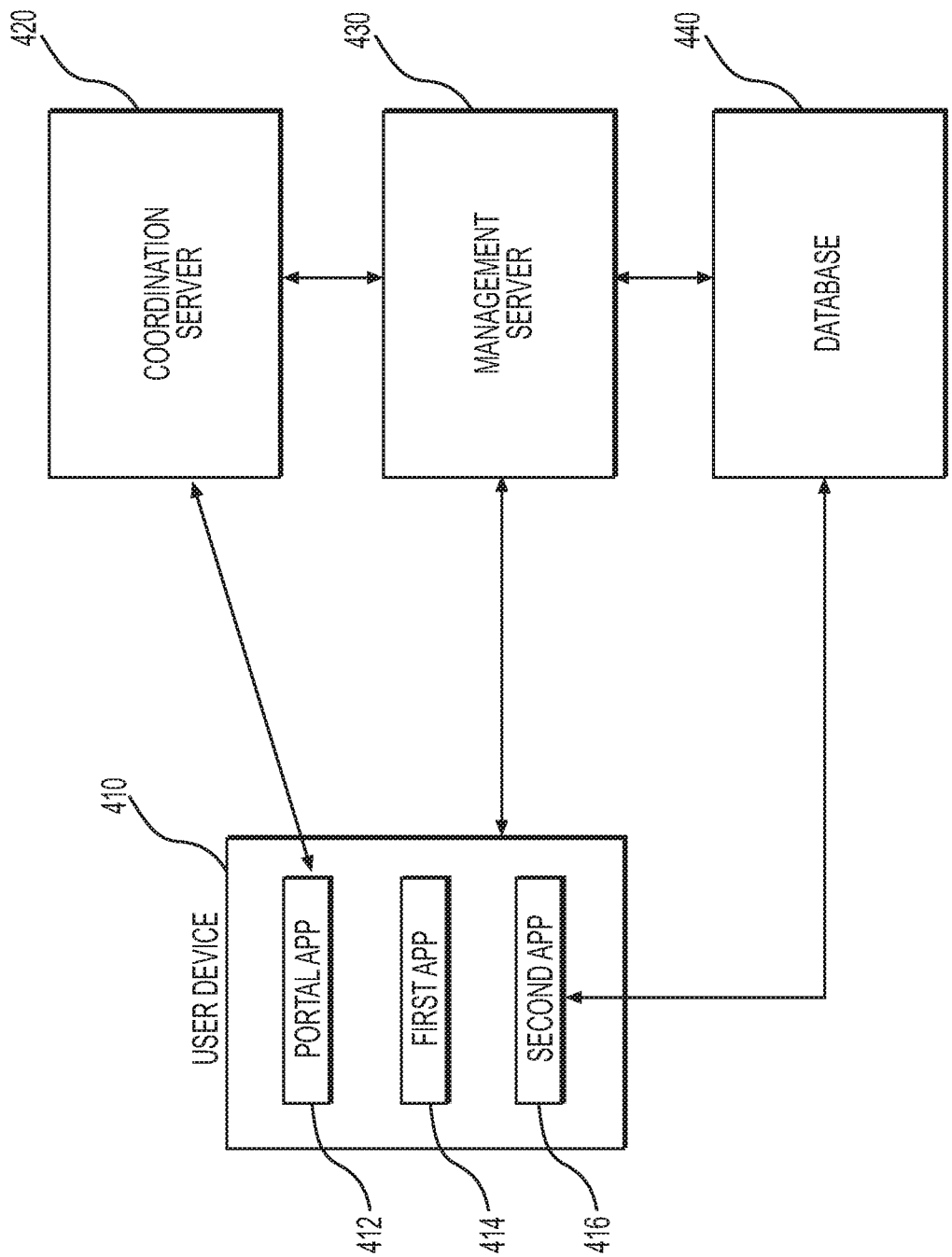
FIG. 4 is an illustration of system components for determining dependency of first application upon a second application and informing a user of the dependency.
Figure 5:
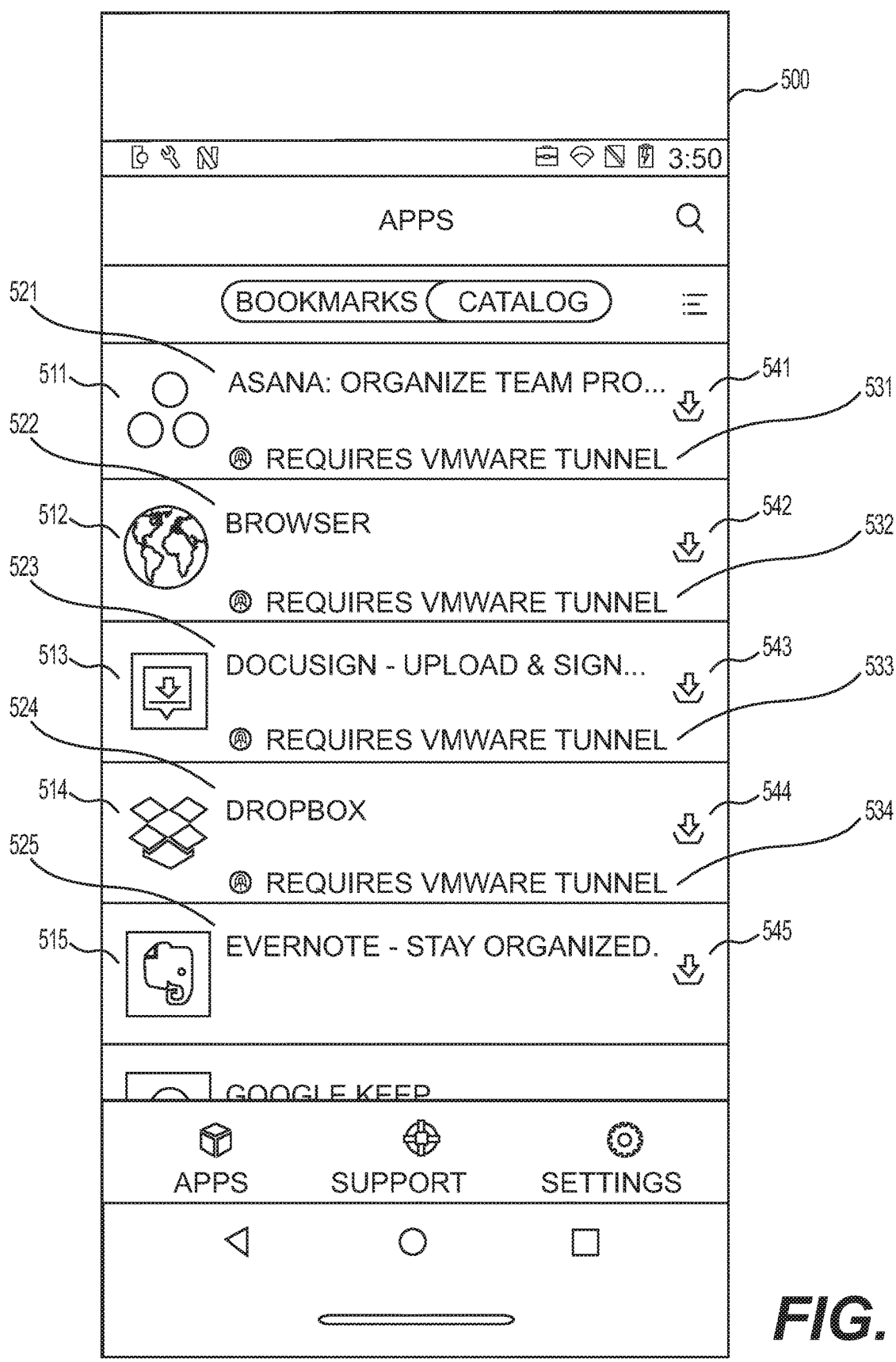
FIG. 5 is an illustration of an example UI associated with the systems and methods disclosed herein.
Figure 6:
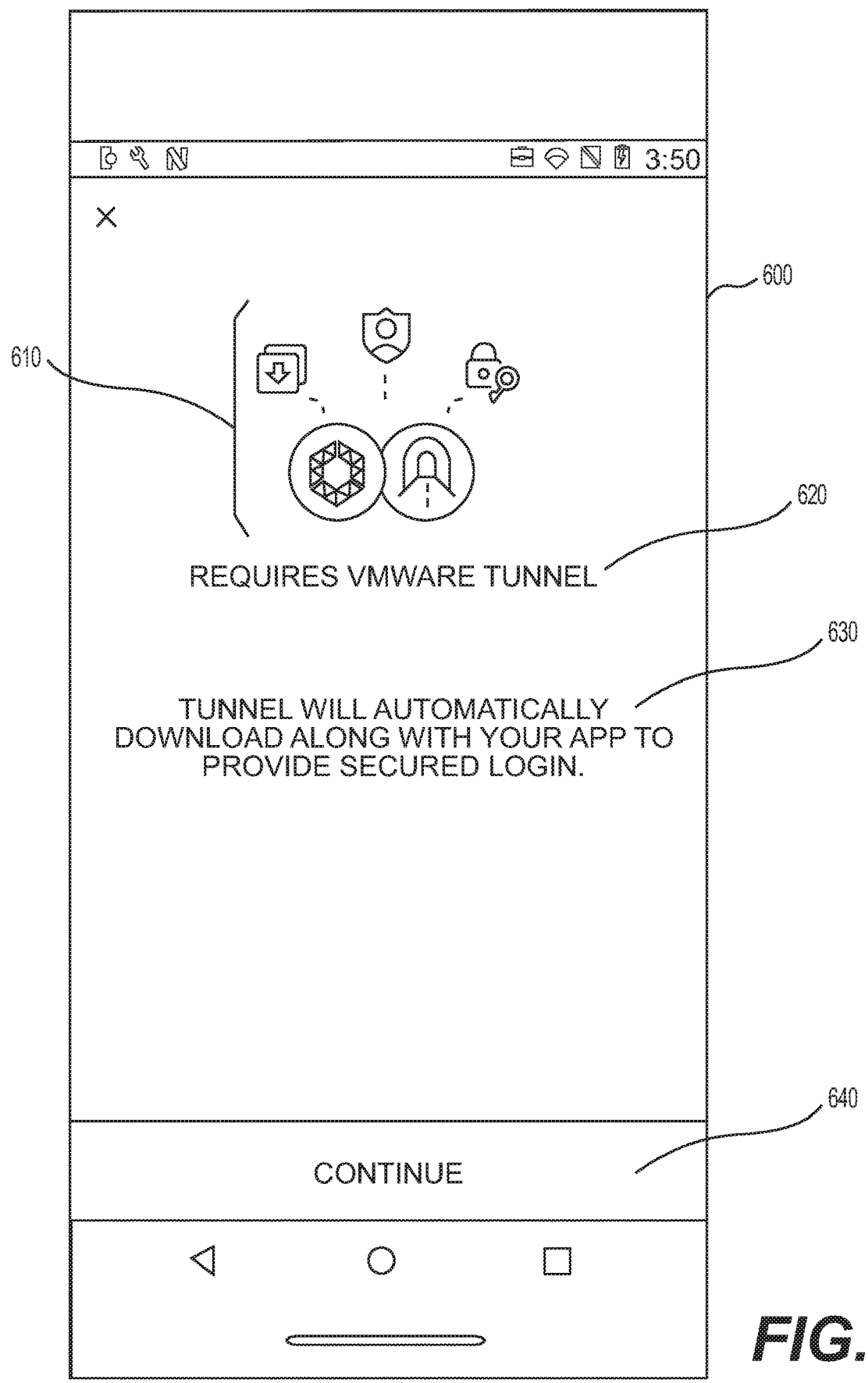
FIG. 6 is an illustration of an example UI associated with the systems and methods disclosed herein.
Figure 7:
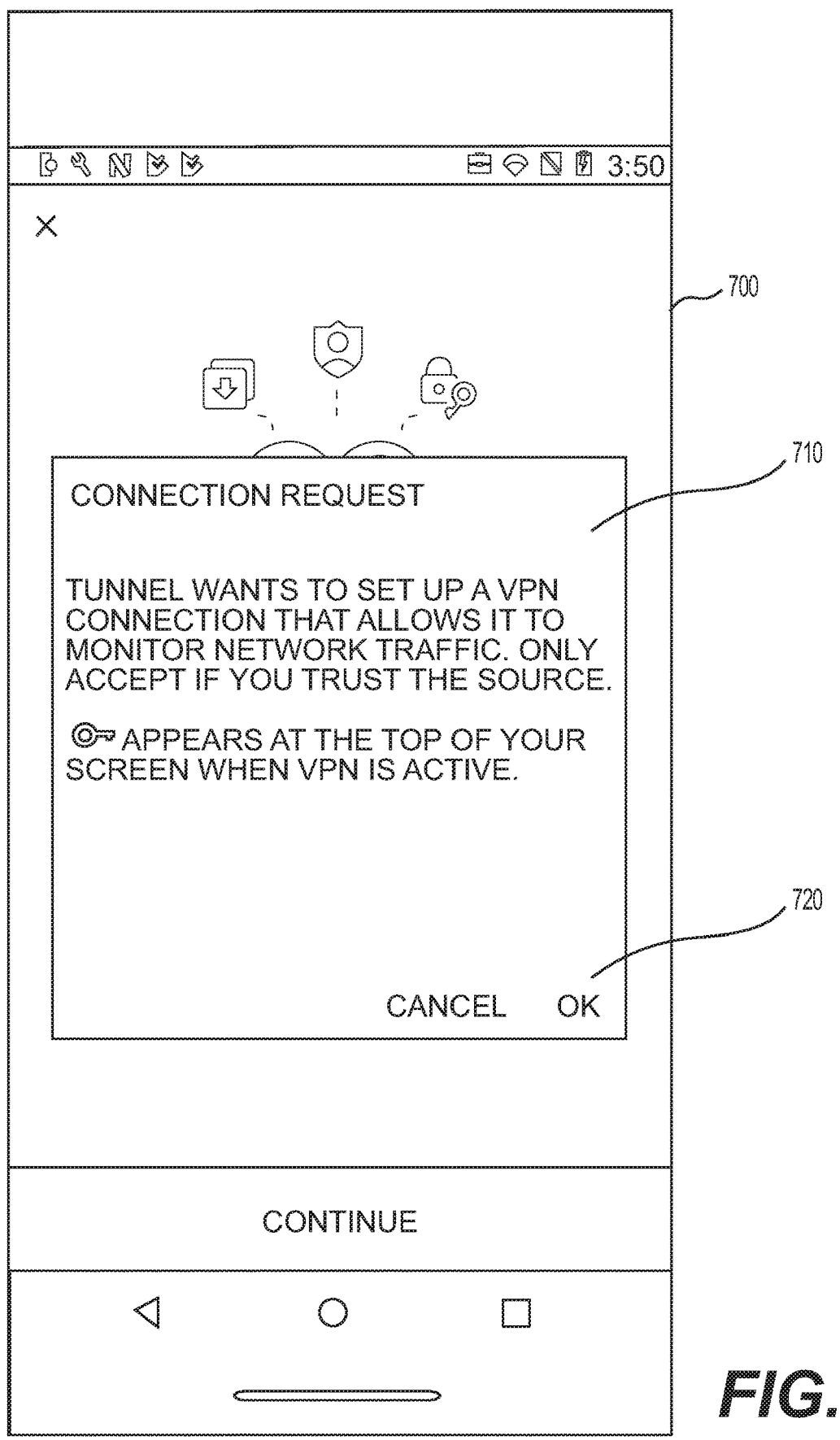
FIG. 7 is an illustration of an example UI associated with the systems and methods disclosed herein.

FIGS. 1 and 2 provide flowcharts of methods for determining dependency of first application upon a second application and informing a user of the dependency, and for assisting a user with installation and initialization of a dependent application, respectively. FIG. 3 provides a more detailed sequence diagram of the methods of FIGS. 1 and 2. FIG. 4 provides an illustration of an example system for performing the methods of FIGS. 1-3. FIGS. 5-7 provide illustrations of example UIs associated with the systems and methods disclosed herein.

Turning to the flowchart of FIG. 1, stage 110 includes requesting a listing of applications available to a user. The request can be made by a portal application, which is an application that provides varying levels of access to multiple other applications that may or may not be installed on the user device. The portal application can display application icons for any applications the user can access, or potentially access. The portal application can store a user's credentials and provide access to any of the applications represented by the icons on the display by authenticating the user to the applications. For example, the portal application can store a user's credentials and other pertinent information. When the user selects an application displayed in the portal, the portal application can authenticate the user by using an SSO service. As a result, the user only needs to login to the portal application to access a variety of other applications without additional logins required.

As an example, a portal application can display a first icon associated with VMWARE's BOXER application, another icon associated with a MICROSOFT EXCEL application, and yet another icon associated with a SALESFORCE application. By selecting one of these icons through the UI presented by the portal application, a user can access the applications associated with those icons. An example portal application is VMWARE's WORKSPACE ONE. The portal application can provide access to enterprise data, such as secure applications (such as an enterprise email account through BOXER), virtual applications, and virtual computer desktops. Enterprise data can be any data associated with an enterprise that is confidential. In some examples, enterprise data is any data that can only be accessed if the user device is enrolled in the EMM or MDM system associated with that enterprise.

The request at stage 110 can be sent to a management server that stores various types of enterprise information. For example, the management server can store information regarding authorizations for particular users, devices, and applications. This information can be stored in profiles at the management server or a database associated with the management server. A system administrator can update or otherwise change the stored information at a console associated with the management server. The request at stage 110, though requesting information from the management server, can be routed through an intermediary server such as a coordination server. The coordination server can assist the process by gathering certain information from the user device and handling communications with the management server.

Stage 120 can include receiving a listing of applications that a relevant user is authorized to access. Along with the listing of application, attributes for applications can also be received. The attributes for applications can include any information relevant to an application, such as whether a secure connection, such as a VPN connection, is necessary to utilize the application. The attributes can also information identifying the purpose of an application, restrictions on using the application, hardware or software requirements for using the application, or any other relevant information. The attributes for the listed applications can be received at the coordination server and pared down or otherwise formatted for use by the portal application. For example, the coordination server can extract an attribute identifying whether a secure connection is required to use an application and pass that attribute to the portal application at stage 120.

Stage 130 can include determining, based on the received attributes, whether a first application requires installation of a second application. This determination can be performed by the coordination server and then communicated to the portal application, or it can be performed by the portal application. In either case, the portal application receives information sufficient to determine whether the first application requires installation of the second application.

At stage 140, the portal application can display icons corresponding to available applications. The portal application can limit the displayed icons to applications that are potentially available to the user on that particular device. A user may have multiple devices that each executes the same portal application, but the portal application may determine that the different devices are entitled to different levels of access to applications. The portal application can therefore display only those applications that are potentially available to the user on the relevant device.

At stage 150, the portal application can display a UI element indicating that an application, such as the first application, requires installation of another application, such as the second application. Displaying the UI element is described in further detail below, for example with respect to FIG. 5.

FIG. 2 provides a flowchart of an exemplary method for assisting a user with installation and initialization of a dependent application, such as the second application described with respect to FIG. 1. At stage 210, the portal application can determine whether the second application is installed on the user's device. The portal application can be granted permissions, either by the user or by virtue of being installed on the device, that allow it to gather information from the device. This information can include an indication of whether a particular application, such as the second application, is installed on the device. In one example, the second application is a tunnel or VPN application.

Stage 220 can include installing the second application on the user device in response to determining that the second application was not installed. The portal application can cause the second application to be downloaded. For example, the portal application can prompt the user to download the second application upon the user attempting to access the first application. Accepting the prompt can cause the first or second application, or both, to be downloaded to the device. In some examples, the portal application can instruct the management server to cause the second application to be downloaded. In yet another example, the portal application can cause a management application resident on the device, such as an agent that is in communication with the management server and has authority to cause the device to take specific actions, to download the second application.

Stage 230 can include determining whether the second application is set up on the user device. Stage 230 can be carried out regardless of the outcome of stage 220. That is, if the second application is already installed at stage 220, the portal application can still check at stage 230 to determine whether it is initialized and set up for use. Similarly, if the second application is downloaded or installed at stage 220, then the portal application can check to determine whether it is initialized and set up for use at stage 230. This can include, for example, determining whether the user has authorized the second application to establish a VPN connection with a management server or other component of the EMM environment.

If the second application is not set up and ready for use, then at stage 240 the portal application can cause the second application to be launched in a specific UI. For example, the UI can be a portal-application-specific UI that matches the look and feel of the portal application. This can include borrowing UI elements from the portal application and displaying them in the second application. In some examples, the UI includes a textual or graphical UI element indicating a relation to the portal application.

At stage 250, the user can be guided through the setup process for the second application using the portal-application-specific UI. This can include prompting the user to accept a connection request for the second application, as described in more detail with respect to FIG. 7. This stage can also include prompting the user for additional information, such as agreeing to a terms-of-use agreement or providing necessary credentials. If multiple steps are required to set up the second application, then this stage can include providing multiple prompts to walk the user through the process step by step.

After the second application is set up and ready for use, at stage 260 the user can be redirected back to the portal application. In one example, the completion of the setup process can trigger the device to open the portal application. The trigger can be detected by the second application, the portal application, or some other application or process running on the device. Once redirected, the user can be presented with a list of available applications, including the first application, in the portal application UI. When the user attempts to launch the first application, the second application can automatically launch or be configured to the extent necessary to enable the desired functionality of the first application. For example, when the user attempts to launch a DROPBOX application (the first application), the device can automatically launch the tunnel application (the second application) and establish a secured connection with the required database or server.

FIG. 3 provides an example sequence diagram encompassing the stages described in FIGS. 1 and 2, showing interactions between various system components. At stage 310, the portal application requests a listing of available applications from a coordination server. The coordination server can be used to streamline communications between a user device and management server. For example, the coordination server can store information about the user and user device making the request, such as a device ID, user credentials, or other relevant information. In some examples, at stage 310 the portal application can request the information directly from the management server rather than going through a coordination server.

At stage 315, the coordination server can request, from the management server, a listing of applications supported by the portal application and available to the specific user and specific user device identified at stage 310. The request can also request application information associated with the applications available to the user. This can include, for example, the application attributes described with respect to FIG. 1. The attributes for applications can include any information relevant to an application, such as whether a secure connection, such as a VPN connection, is necessary to utilize the application. The attributes can also information identifying the purpose of an application, restrictions on using the application, hardware or software requirements for using the application, or any other relevant information. The attributes for the listed applications can be received at the coordination server and pared down or otherwise formatted for use by the portal application.

The management server can provide a listing of applications and associated application information to the coordination server at stage 320. In one example, the management server stores one or more profiles for each user and each device of the user. These profiles can include a VPN profile that includes information associated with establishing a VPN connection between the user's device and the management server (or another server within the EMM system). The VPN profile can include, for example, an indication of whether a particular application requires a VPN connection in order to access particular data. The VPN profile can also include credentials for making the VPN connection. Stage 320 can include extracting this application-dependency information from the VPN profile and providing it to the coordination server.

At stage 330, the coordination server can parse the information received at stage 320 and check for application dependencies. For example, the application information can indicate that a first application, such CONTENT LOCKER, requires a second application, such as VMWARE TUNNEL, in order to access certain files. At stage 335, the coordination server can identify relevant application dependencies, such as the example just described, to the portal application. In some examples, the management server can deliver the application information directly to the portal application, which can check for and identify application dependencies without using a coordination server.

Based on the application dependencies identified at stage 335, the portal application can display UI elements indicating dependencies at stage 340. This can include, for example, displaying text, one or more graphical elements, or a combination thereof, within the portal application UI. For example, and as discussed in more detail with respect to FIG. 5, the portal application can display icons associated with available applications as well as UI elements that include text stating "Requires VMware Tunnel" at a location proximate to each relevant icon.

At stage 345, the portal application can inform the user of an application dependency when the user attempts to download or otherwise access an application. For example, when the user selects an icon for a first application that requires a tunnel connection, the portal application can display a UI page or element informing the user that a second application is required and will be downloaded along with the selected application. An example UI page is shown in FIG. 6 and described in more detail in association with that drawing.

At stage 350, the portal application can cause the second application to be downloaded. This stage can be triggered by the user accepting a prompt provided at stage 345, in one example. In another example, this stage can occur automatically based on the user attempting to download the first application. The portal application can detect when the second application is successfully downloaded at stage 355.

At stage 360, the portal application can cause the second application to launch into a specific UI, such as a portal-application-specific UI that matches the look and feel of the portal application. The UI of the second application can include UI elements from the portal application. In some examples, the UI includes a textual or graphical UI element indicating a relation to, or even mimicking, the portal application.

At stage 365, the user can be guided through the setup process for the second application using the portal-application-specific UI. This can include prompting the user to accept a connection request for the second application, as described in more detail with respect to FIG. 7. This stage can also include prompting the user for any additional information, such as agreeing to a terms-of-use agreement or providing necessary credentials. If multiple steps are required to set up the second application, then this stage can include providing multiple prompts to walk the user through the process step by step.

At stage 370, the user can be redirected back to the portal application. In one example, the completion of the setup process can trigger the device to open the portal application. The trigger can be detected by the second application, the portal application, or some other application or process running on the device. Once redirected, the user can be presented with a list of available applications, including the first application, in the portal application UI. When the user attempts to launch the first application, the second application can automatically launch or be configured to the extent necessary to enable the desired functionality of the first application.

FIG. 4 is an illustration of system components for carrying out the methods described above, including those with respect to FIGS. 1-3. The system can include a user device 410 of a user. The user device 410 can be any type of computing device, such as a phone, tablet, watch, laptop, or desktop computer. The user device 410 can include a processor and memory storage. It can also communicate over a network, such as the internet, in wired or wireless fashion, using one or more components associated with the device. The user device 410 can include various applications, including a portal application 412, first application 414, and second application 416, as previously described.

The portal application 412 can communicate with a coordination server 420, as described with respect to FIG. 3. The coordination server 420 can be a single server or a network of servers that include one or more processors and memory storage locations. The coordination server 420 can store information about the user and user device making the request, such as a device ID, user credentials, or other relevant information. The portal application 412 can communication with the coordination server 420 by, for example, requesting a listing of available applications from the coordination server 420.

The coordination server 420 can communicate with a management server 430. The management server 430 can also be a single server or a network of servers that include one or more processor and memory storage locations. In some examples, the coordination server 420 and management server 430 are part of the same server or network of servers. In other examples, the functions of the coordination server 420 are handle by the management server 430, while in some examples the functions of the management server 430 are handled by the coordination server 420. The management server 430 can enforce compliance rules at the user device 410 through a management agent installed on the user device. If a compliance rule is broken, such as by a user installing blacklisted software on the device 410, the management server 430 can enforce remedial measures at the device 410, such as by locking the device 410 or deleting enterprise information from the device 410.

The coordination server 420 can communicate with the management server 430 by, for example, requesting a listing of applications supported by the portal application 412 and available to the specific user and specific user device 410. The management server 430 can provide a listing of applications and associated application information to the coordination server 420 at describe in conjunction with stage 320 of FIG. 3, for example. In some examples, the management server 430 can obtain requested information from a database 440. The database 440 can be a storage location external to the management server 430, or alternatively it could be a part of the management server 430. The database 440 can include tables that link applications to dependent applications, in an example.

The coordination server 420 can receive the listing of applications and associated application information from the management server 430 and provide some, or all, of that information to the portal application 412 on the user device 410. The portal application 412 can use that information to determine, for example, that when a user attempts to download the first application 414 to the user device 410, the user will be prompted to download the second application 416. This process is described with respect to stages 335-355 of FIG. 3.

Once downloaded, the second application 416 can be launched using a UI specific to the portal application 412. The user can be guided through the initialization or setup process within the second application 416 and then redirected back to the portal application 412. Then, when the user accesses the first application 414 through the portal application 412, the first application 414 can access the database 440 by making use of a secure connection provided by the second application 416.

FIG. 5 is an illustration of an example UI 500 associated with the systems and methods disclosed herein. For example, the UI 500 of FIG. 5 can be displayed within a portal application 412 installed on a user device 410. The UI 500 can display a list of application icons 511, 512, 513, 514, 515 as well as associated application names 521, 522, 523, 524, 525, respectively. Selecting an application icon can cause the associated application to launch, either inside or outside of the portal application 412 UI.

Each displayed application can include a download button 541, 542, 543, 544, 545 that, if selected by a user, causes the portal application 412 to attempt to download that application. If the application is not available for download, no download button will be displayed on the UI for that application. On the other hand, if an application is currently downloading, the download button 541, 542, 543, 544, 545 can be displayed differently to indicate that the download is in progress, such as by displaying a timer, circular motion graphic, or any other icon or graphic.

As shown in FIG. 5, the portal application 412 can also display application-dependency UI elements 531, 532, 533, 534 for any applications that depend upon another application for certain functionalities. In the example of FIG. 5, four of the applications require VMWARE TUNNEL, and therefore application-dependency UI elements 531, 532, 533, 534 are displayed proximate to the icons 511, 512, 513, 514 or application names 521, 522, 523, 524 of each of those four applications.

In some examples, if the required dependent application is already installed and setup on the user device 410, the portal application 412 can hide the application-dependency UI elements 531, 532, 533, 534. In another example, the UI 500 can include an additional UI element that indicates whether the dependent application is downloaded. For example, a checkbox can be displayed next to each application-dependency UI element 531, 532, 533, 534 for which the dependent application has already been downloaded and set up.

FIG. 6 provides an illustration of another example UI 600 that can be displayed, for example, within a portal application 412 on a user device 410. The UI 600 of FIG. 6 can be displayed when a user selects an application, such as an application displayed in the list illustrated by FIG. 5, and that application requires another application. In the example of FIG. 6, the selected application requires a second application 416, which in this example is VMWARE TUNNEL.

The UI 600 page can display an indication 620 that the second application 416 is required. It can also display a more detailed description 630 explaining that the required second application 416 will be downloaded along with the selected application. The detailed description 630 can provide reasons as to why the second application 416 is necessary. The UI 600 can also include a button 640 that the user can select to indicate that they wish to proceed.

The UI 600 can also display one or more graphical elements 610 associated with the portal application 412, indicating to the user that messages on this page 600 are originating from the portal application 412 and can be trusted. Similar graphical elements 610 can be displayed within a portal-application-specific UI of the second application 416, as described above with respect to stages 360 and 365 of FIG. 3.

An example illustration of a portal-application-specific UI 700 is provided in FIG. 7. This UI 700 can be displayed by the second application 416, rather than the portal application 412, while having a similar look and feel. For example, the UI 700 of the second application 416 can include one or more graphical elements 610 from the portal application UI 600 shown in FIG. 6. In this example, the majority of those graphical elements 610 are obscured by a window 710 guiding the user through the setup process for the second application 416. In one example, the second application 416 can receive some or all of the graphical elements 610 by communicating with the portal application 412 or the management server 430.

In the example of FIG. 7, the second application 416 is a tunnel application that requires the user's consent before establishing a VPN connection. The user can agree to the VPN connection using the selection buttons 720 provided in the window 710. After agreeing, the second application 416 can establish the VPN connection and make it available whenever the user selections an application, such as the first application 416, that depends upon the VPN connection.

FIG. 7 also includes an explanation of a key symbol that can appear at the top of the screen with the VPN connection is active. The key symbol can be displayed within a header that includes other symbols or information, such as the time, battery level, and connectivity level of the device. The key symbol can be displayed elsewhere on the screen as well, either in addition to the key symbol at the top of the screen or instead of it.

In some examples, the key symbol can be displayed on the screen of the device any time the tunnel application is active. For example, when the user launches an application that automatically launches the tunnel application, the key symbol can be displayed. In another example, the key symbol can be displayed on the screen of the device any time data is being transmitted to or from the tunnel application. For example, the key symbol can be displayed when the device is making a request for secure email resources from an email server using the VPN connection.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather, any feature of any example described here can be incorporated into any other suitable example. It is intended that the specification and examples be considered as exemplary only, with a true scope and spirit of the disclosure being indicated by the following claims.

What is claimed is:

1. A method for determining dependency of a first application upon a second application and informing a user of the dependency, comprising:

requesting, by a portal application installed on a user device, a listing of different applications available to the user through the portal application, wherein the portal application is configured to launch and provide stored authentication credentials to the available applications;

receiving the listing of available applications, wherein the listing includes a plurality of attributes for each available application, and wherein the listing includes the first application as an available application;

determining, based on at least one of the plurality of attributes for the first application, that the first application requires installation of the second application for the first application to provide additional functionality;

displaying a first user interface (UI) page within the portal application, the first UI page including icons corresponding to the available applications, including the first application;

displaying a UI element indicating that the first application requires installation of the second application for the first application to provide additional functionality;

receiving from the user a selection to download the first application; and based on the selection to download the first application, displaying a second UI page within the portal application, the second UI page informing the user that the second application is required for the first application to provide additional functionality.

2. The method of claim 1, wherein the at least one of the plurality of attributes is an application-dependency attribute listed in a profile associated with the user and stored at a management server.

3. The method of claim 1, wherein the second application establishes a secure Virtual Private Network (VPN) connection between the user device and at least one remote server.

4. The method of claim 1, further comprising, if the second application is not installed on the user device, installing the second application on the user device.

5. The method of claim 1, further comprising, if the second application is not set up on the user device, launching the second application to a portal-application-specific UI within the second application.

6. The method of claim 5, further comprising guiding the user through a setup process using the portal-application-specific UI of the second application.

7. The method of claim 6, further comprising, after the user completes the setup process, redirecting the user back to the portal application.

8. A non-transitory, computer-readable medium comprising instructions that, when executed by a processor of a computing device, perform stages for determining dependency of a first application upon a second application and informing a user of the dependency, the stages comprising:
requesting, by a portal application installed on a user device, a listing of different applications available to the user through the portal application, wherein the portal application is configured to launch and provide stored authentication credentials to the available applications;
receiving the listing of available applications, wherein the listing includes a plurality of attributes for each available application, and wherein the listing includes the first application as an available application;
determining, based on at least one of the plurality of attributes for the first application, that the first application requires installation of the second application for the first application to provide additional functionality;
displaying a first user interface (UI) page within the portal application, the first UI page including icons corresponding to the available applications, including the first application;
displaying a UI element indicating that the first application requires installation of the second application for the first application to provide additional functionality;
receiving from the user a selection to download the first application; and
based on the selection to download the first application, displaying a second UI page within the portal application, the second UI page informing the user that the second application is required for the first application to provide additional functionality.

9. The non-transitory, computer-readable medium of claim 8, wherein the at least one of the plurality of attributes is an application-dependency attribute listed in a profile associated with the user and stored at a management server.

10. The non-transitory, computer-readable medium of claim 8, wherein the second application establishes a secure Virtual Private Network (VPN) connection between the user device and at least one remote server.

11. The non-transitory, computer-readable medium of claim 8, the stages further comprising, if the second application is not installed on the user device, installing the second application on the user device.

12. The non-transitory, computer-readable medium of claim 8, the stages further comprising, if the second application is not set up on the user device, launching the second application to a portal-application-specific UI within the second application.

13. The non-transitory, computer-readable medium of claim 12, the stages further comprising guiding the user through a setup process using the portal-application-specific UI of the second application.

14. The non-transitory, computer-readable medium of claim 13, the stages further comprising, after the user completes the setup process, redirecting the user back to the portal application.

15. A system for determining dependency of a first application upon a second application and informing a user of the dependency, comprising:
a memory storage including a non-transitory, computer-readable medium comprising instructions; and
a computing device including a processor that executes the instructions to carry out stages comprising:
requesting, by a portal application installed on a user device, a listing of different applications available to the user through the portal application, wherein the portal application is configured to launch and provide stored authentication credentials to the available applications;
receiving the listing of available applications, wherein the listing includes a plurality of attributes for each available application, and wherein the listing includes the first application as an available application;
determining, based on at least one of the plurality of attributes for the first application, that the first application requires installation of the second application for the first application to provide additional functionality;
displaying a first user interface (UI) page within the portal application, the first UI page including icons corresponding to the available applications, including the first application;
displaying a UI element indicating that the first application requires installation of the second application for the first application to provide additional functionality;
receiving from the user a selection to download the first application; and
based on the selection to download the first application, displaying a second UI page within the portal application, the second UI page informing the user that the second application is required for the first application to provide additional functionality.

16. The system of claim 15, wherein the at least one of the plurality of attributes is an application-dependency attribute listed in a profile associated with the user and stored at a management server.

17. The system of claim 15, wherein the second application establishes a secure Virtual Private Network (VPN) connection between the user device and at least one remote server.

18. The system of claim 15, the stages further comprising, if the second application is not installed on the user device, installing the second application on the user device.

19. The system of claim 15, the stages further comprising, if the second application is not set up on the user device, launching the second application to a portal-application-specific UI within the second application.

20. The system of claim 19, the stages further comprising guiding the user through a setup process using the portalapplication-specific UI of the second application and redirecting the user back to the portal application.

\* \* \* \* \*